United States Patent
Hiranaka et al.

(10) Patent No.: US 10,947,155 B2
(45) Date of Patent: Mar. 16, 2021

(54) RECYCLING METHOD OF DIHYDRATE GYPSUM FROM WASTE GYPSUM BOARDS

(71) Applicant: Tokuyama Corporation, Shunan (JP)

(72) Inventors: Shingo Hiranaka, Shunan (JP); Kentaro Matsuo, Shunan (JP); Makoto Kataoka, Shunan (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 0 days.

(21) Appl. No.: 16/659,598

(22) Filed: Oct. 22, 2019

(65) Prior Publication Data
US 2020/0123055 A1 Apr. 23, 2020

(30) Foreign Application Priority Data

Oct. 23, 2018 (JP) .............................. JP2018-199095

(51) Int. Cl.
*C04B 11/26* (2006.01)
*C04B 11/032* (2006.01)

(52) U.S. Cl.
CPC .......... *C04B 11/262* (2013.01); *C04B 11/032* (2013.01)

(58) Field of Classification Search
CPC ..... C04B 11/032; C04B 11/26; C04B 11/262; C04B 18/167; C04B 28/14; C04B 40/0028; C04B 7/26; Y02W 30/91; B09B 3/00; C01F 11/46
See application file for complete search history.

(56) References Cited

U.S. PATENT DOCUMENTS 8,529,863 B2 * 9/2013 Yokoyama ............ C01F 11/466
423/555
9,458,025 B2 * 10/2016 Yokoyama .............. C01F 11/46

FOREIGN PATENT DOCUMENTS

| JP | 2010-13304 A | 1/2010 |
| JP | 2017-095287 A | 6/2017 |
| JP | 6336385 B2 | 6/2018 |
| WO | 2014/141926 A1 | 9/2014 |

OTHER PUBLICATIONS

Machine Translation of Japanese Patent Specification No. JP2010-013304A (specification only) (Year: 2010).*
Machine Translation of Japanese Patent Specification No. JP 2017-095287 A (specification and claims only) (Year: 2017).*
Official Communication issued in European Patent Application No. 19204356.0, dated Feb. 13, 2020.

* cited by examiner

*Primary Examiner* — Anthony J Green
(74) *Attorney, Agent, or Firm* — Keating and Bennett, LLP

(57) ABSTRACT

Gypsum derived from waste gypsum boards is calcined and converted into gypsum granules including hemihydrate and/or anhydrous type III gypsum. The calcined gypsum granules are dropped into water to prepare a gypsum slurry. Then, dihydrate gypsum particles are crystalized in the slurry. The temperature of the gypsum granules just before being dropped into the water is 90° C. or higher.

3 Claims, 1 Drawing Sheet

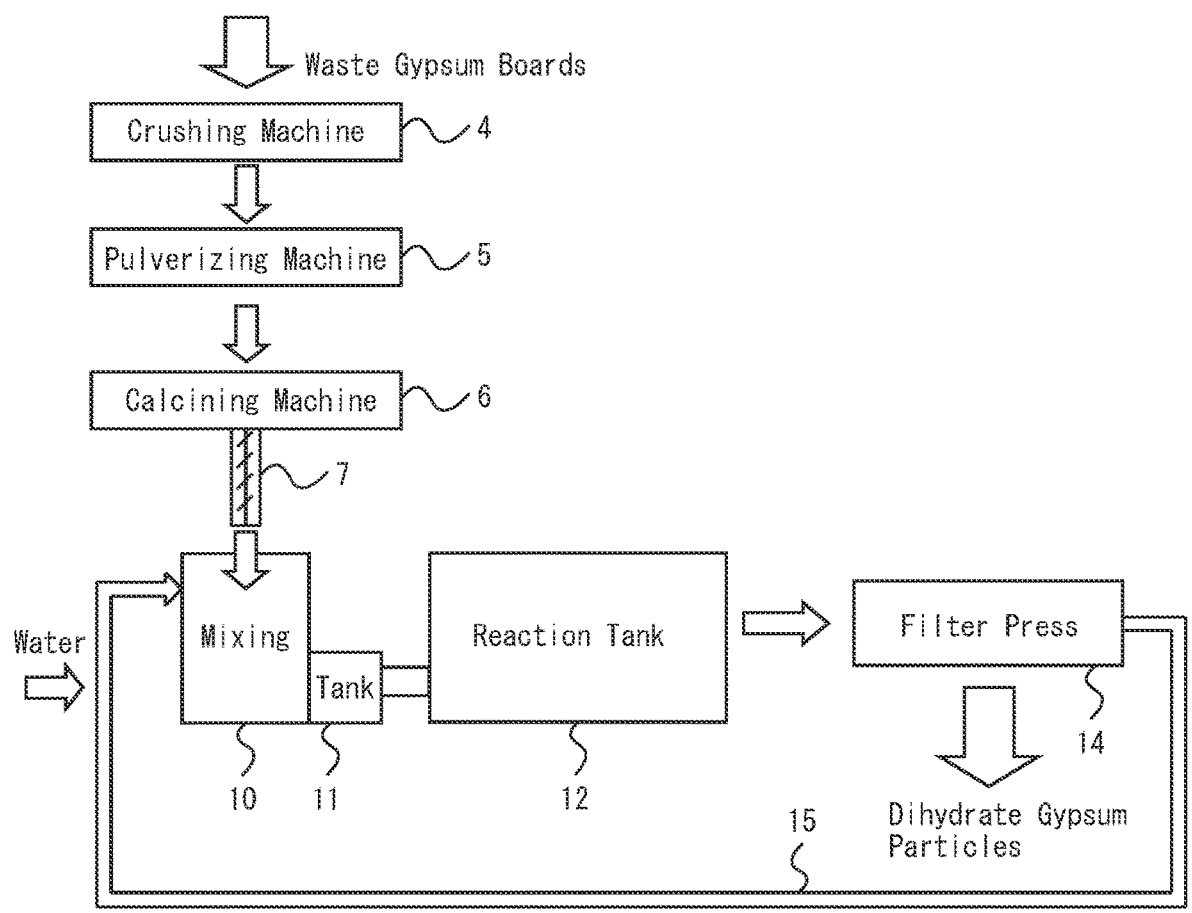

RECYCLING METHOD OF DIHYDRATE GYPSUM FROM WASTE GYPSUM BOARDS

CROSS REFERENCE TO RELATED APPLICATIONS

This application claims the benefit of priority to Japanese Patent Application No. 2018-199095 filed on Oct. 23, 2018. The entire contents of this application are hereby incorporated herein by reference.

BACKGROUND OF THE INVENTION

1. Field of the Invention

The present invention relates to a method of recycling dihydrate gypsum from waste gypsum boards.

2. Description of the Related Art

The present inventors and others have succeeded in commercially recycling dihydrate gypsum from waste gypsum boards (JP2010-13304A, WO2014/141926A, JP6336385B). JP2010-13304A discloses to pulverize and then to calcine waste gypsum boards, to further pulverize the calcined gypsum more finely, and to mix the finely powdered gypsum with water. The slurry of water and the gypsum is cured to crystalize gypsum particles. JP2010-13304A discloses that the fine pulverization makes the average particle size of the crystalized gypsum particles larger.

WO2014/141926A discloses to warm the inlet of the mixing tank containing water for gypsum granules such that scales resultant from the reaction of gypsum and water vapor do not clog the inlet. The temperature referred to in WO2014/141926A is that of the inlet itself and differs from the temperature of the gypsum granules.

JP6336385B discloses a structure of the mixing tank for mixing gypsum granules with water that is configured to prevent the inclusion of surrounding air into the slurry.

SUMMARY OF THE INVENTION

The present inventors have noticed a foam layer covering the slurry surface is generated when gypsum granules are dropped into water for preparing the gypsum slurry. The foam includes a large quantity of gypsum and prevents uniform dispersion of gypsum into the slurry. Therefore, the particle growth of gypsum is hindered and aggregated particles of gypsum are included in the dihydrate gypsum particles. These facts make the quality of dihydrate gypsum lower. Further, the foam causes cavitation in a slurry pump so that the feeding of the slurry is not uniform.

Preferred embodiments of the present invention reduce the foaming when gypsum granules are dropped into water so that the gypsum granules are promptly dispersed in the slurry.

A method of recycling dihydrate gypsum from waste gypsum boards according to a preferred embodiment of the present invention includes calcining gypsum derived from waste gypsum boards in order to convert the gypsum into hemihydrate and/or anhydrous type III gypsum granules, dropping the gypsum granules after calcination into water in order to mix the gypsum granules with the water to prepare a gypsum slurry, and crystalizing dihydrate gypsum particles in the gypsum slurry.

In a preferred embodiment of the present invention, the temperature of the gypsum granules just before being dropped into the water is 90° C. or higher.

The dispersion of gypsum granules into the water is remarkably different according to whether the gypsum granule temperature just before being dropped is at least 90° C. or less than 90° C. At 90° C. or higher, the gypsum granules sink promptly and disperse uniformly (see Table 1). In addition, there is little foaming, dihydrate gypsum particles sufficiently grow, and no aggregated particles are generated in the dihydrate gypsum particles.

On the contrary, at a temperature less than 90° C., gypsum granules float on the liquid surface (see Table 1), and air gradually released from the gypsum granules cause foam on which the gypsum granules adhere. The foam causes cavitation in a slurry pump and makes the supply of the slurry unstable. Further, since the gypsum granules are prevented from dispersing in the water uniformly, the particle growth of dihydrate gypsum is slow, and aggregated particles containing dihydrate gypsum or the like are generated. Dihydrate gypsum particles that are not fully grown include a larger quantity of adhered water, and the energy efficiency of producing gypsum boards from the recycled dihydrate gypsum is lowered. The aggregate particles in the recycled gypsum hinder the production of a uniform gypsum slurry for producing gypsum boards.

Preferably, the gypsum granules are dropped into the water without pulverization after the calcination. When gypsum granules are further pulverized after calcination, the particle size is smaller, and air in the granules is easily substituted with water. This reduces the foaming, even if the temperature when dropping the gypsum granules is lower. However, according to a preferred embodiment of the present invention, the gypsum temperature just before being dropped is 90° C. or higher in order to prevent the foaming, and fine pulverization after calcination is not needed.

Further preferably, the temperature of the gypsum granules just before being dropped into the water is maintained at 90° C. or higher due to residual heat from the step of calcining. Since no further pulverization is performed after calcination, the prompt dropping of gypsum granules from the calcining machine into the water allows maintaining the gypsum temperature just before being dropped at 90° C. or higher only due to the residual heat.

The above and other elements, features, steps, characteristics and advantages of the present invention will become more apparent from the following detailed description of the preferred embodiments with reference to the attached drawings.

BRIEF DESCRIPTION OF THE DRAWINGS

The FIGURE is a process diagram indicating a recycling method of dihydrate gypsum according to a preferred embodiment of the present invention.

DETAILED DESCRIPTION OF THE PREFERRED EMBODIMENTS

Preferred embodiments of the present invention will be described in the following. The scope of the present invention shall be construed according to the claims, in in view of the specification and well-known art, as ordinary technicians in the art understand.

A method of recycling dihydrate gypsum according to a preferred embodiment of the present invention is described in the FIGURE. Waste gypsum boards are crushed by a crushing machine 4 into board pieces. The board pieces are pulverized by a pulverizing machine 5 to produce gypsum granules having, for example, an average particle size of about 0.5 mm to about 20 mm and preferably having an average particle size of about 1 mm to about 10 mm. When the average particle size is too large, the solution and dispersion of gypsum granules into a slurry is slow. Average particle sizes that are too small do not cause problems but increases the cost of pulverization. After the pulverization by the pulverizing machine 5, board paper pieces and gypsum granules become separable, for example, by a wind shifter and, therefore preferably, the board paper pieces are separated from gypsum granules.

When the average particle size of the gypsum granules is smaller, foaming when the gypsum granules are dropped into a mixing tank is reduced. However, when gypsum granules having a temperature of 90° C. or higher is dropped into the mixing tank, the foaming is almost completely prevented and, therefore, the fine pulverization is not necessary. The average particle size of the gypsum granules is measured by, for example, sieving the granules with a plurality of sieves having different aperture sizes and then obtaining the particle size distribution.

The pulverized gypsum granules are heated, for example, to a temperature from about 130° C. to about 160° C., including the lower limit and the upper limit, by a calcining machine 6 and are converted into hemihydrate gypsum and/or anhydrous type III gypsum. The calcining temperature is generally from about 100° C. to about 200° C., including the lower limit and the upper limit, and is preferably from about 110° C. to about 160° C., including the lower limit and the upper limit. The calcining period is, for example, from about 2 minutes to about 60 minutes, including the upper and lower limits, and preferably for about 5 minutes to about 30 minutes, including the upper and lower limits. The heating method is arbitrary and may include a hot wind method, a heat conduction method, and an infra-red radiation method, for example. The calcination does not change the morphology of the gypsum granules and, therefore, the average particle size of the gypsum granules after pulverization is substantially the same as the average particle size of the gypsum granules when dropped into the slurry.

The calcined gypsum granules are dropped into a mixing tank 10 by a transferring device, such as a screw conveyor 7, without cooling and keeping the temperature of the gypsum granules at 90° C. or higher. Arbitrary transferring devices may be usable and air transfer or the like may be possible, for example. However, since a small heat loss during the transfer is preferable, the screw conveyor 7 or the like is preferable in this regard. While not advantageous with regard to energy efficiency, the calcined gypsum granules may be stored once and then may be re-heated before being dropped into the mixing tank 10.

The temperature of gypsum just before being dropped into the mixing tank refers to the temperature just before the outlet of the screw conveyor 7 (just before the inlet into the mixing tank 10), and may be measured by piercing a thermistor into the gypsum, for example. In place of the thermistor, a thermocouple and an infra-red ray temperature meter may be used. Since the temperature decrease between a position just before the outlet of the screw conveyor 7 until falling into the mixing tank 10 is negligible, the measured temperature indicates the temperature of the gypsum granules when dropped into the slurry.

The structure of the mixing tank 10 is arbitrary and, in a preferred embodiment of the present invention, the mixing tank described in JP6336385B may be used. Into the mixing tank 10, filtrate from a filter press 14 which will be described below and usually water are fed at a temperature of about 60° C., and the slurry temperature in the mixing tank 10 was about 60° C. Preferably, the slurry temperature is generally from about 40° C. to about 80° C., including the upper and lower limits. When the gypsum granules were dropped at a temperature of 90° C. or higher, the dropped gypsum granules into the mixing tank 10 sank and dispersed in the slurry without foaming.

When the temperature of gypsum granules just before being dropped was about 80° C. or lower, it was observed that a foam layer was generated on the surface of the mixing tank 10 and that the foam included the gypsum granules. This made the dispersion of the gypsum granules into the slurry not uniform. Further, the foam made the slurry flow by a slurry pump 11 unstable and, as a result, the continuous reaction process easily became unstable.

The gypsum slurry is fed from the mixing tank 10 by a slurry pump 11 under pressure into a reaction tank 12, and the slurry is maintained at, for example, about 60° C. while stirring in order to crystalize dihydrate gypsum particles. The reaction tank 12 may be a one-stage tank or a multi-stage tank. The dihydrate gypsum particles crystalized in the reaction tank 12 are separated by a solid-liquid separation device such as a filter press 14, and the filtrate is fed, for example, into the mixing tank 10 through a feedback route 15. In addition, the water lost with the dihydrate gypsum particles is compensated through the feedback route 15. In a preferred embodiment of the present invention, the mixing tank 10 and the reaction tank 12 are separate. However, a single reaction tank made by combining the two tanks may be provided and the gypsum granules may be dropped into the combined reaction tank.

When dropped at a temperature of 90° C. or higher, the gypsum granules dissolve in the slurry uniformly, and the dihydrate gypsum particles extracted by the filter press 14 do not contain aggregated particles and are fully grown. On the contrary, when the temperature just before being dropped is about 80° C. or lower, the extracted dihydrate gypsum particles include aggregated particles and the particle growth of the dihydrate gypsum is not sufficient. The aggregated particles make the preparation of a uniform gypsum slurry difficult when producing gypsum boards. Further, the dihydrate gypsum is converted to hemihydrate gypsum or the like before producing gypsum boards. The larger average particle size of the dihydrate gypsum reduces the adhered water content and also reduces the energy necessary for the conversion into the hemihydrate gypsum or the like.

Preferred Example 1

Dihydrate gypsum waste having an average particle size of 2 mm resulting from crushing and pulverizing waste gypsum boards was heated at a temperature of 130° C. by a hot wind drier and converted into hemihydrate gypsum. The hemihydrate gypsum was dropped at a rate of 100 g/hr and water at a temperature of 60° C. was dropped at a rate of 200 mL/hr into gypsum slurry of 3000 mL having a concentration of 40 mass %. The slurry was always stirred and maintained at 60° C. In a preferred embodiment, the hemihydrate gypsum before being dropped was warmed and the temperature just before being dropped into the slurry was maintained at 105° C. The dropping of gypsum caused nearly no foaming and the hemihydrate gypsum was promptly dispersed in the slurry.

The feeding of hemihydrate gypsum and water was continued for 40 hours, and then, the slurry was extracted and filtered to separate crystalized dihydrate gypsum particles. By a laser photo-scattering method, the volume-averaged particle size of dihydrate gypsum particles was measured as 73 μm, and no aggregated particles were observed in the slurry through a microscope.

Comparative Example 1

Hemihydrate gypsum cooled at room temperature was dropped into the slurry. Except for this, dihydrate gypsum particles were crystalized in the same way as in Preferred Example 1. When dropping the hemihydrate gypsum, the liquid surface was covered with a foam layer having a thickness of about 5 mm and the foam included a large amount of gypsum granules. The slurry was extracted after 40 hours from starting the supply, the average particle size of the crystalized dihydrate gypsum was 41 μm, and aggregated gypsum particles were observed in the slurry.

Comparative Example 2

Hemihydrate gypsum at a temperature just before being dropped was maintained at about 80° C. Except for this, dihydrate gypsum particles were crystalized in the same way as in Preferred Example 1. Also in this case, when dropping the hemihydrate gypsum, the liquid surface was covered with a foam layer having a thickness of about 5 mm. The average particle size of the crystalized dihydrate gypsum was 43 μm after 40 hours from starting the supply, and aggregated gypsum particles were observed in the slurry.

The relationship between the temperatures of gypsum pieces and periods until they sank was measured with various gypsum temperatures just before being dropped and various water temperatures. Gypsum board waste was heated to 130° C. to convert into hemihydrate gypsum, cubic pieces having each edge of about 10 mm and a weight of 0.6 g were cut with a cutter-knife. The cubes were re-heated and dropped into a beaker containing 200 mL of water and the periods until the cubes sank in the water were observed. The results are shown in Table 1.

TABLE 1

Gypsum Temperature just before Dropped and Period till Sinking (seconds)

| Gypsum Temperature *1 | Water Temperature | | |
|---|---|---|---|
| | Room Temperature | 60° C. | 80° C. |
| Room Temperature | >600 s | >600 s | >600 s |
| 60° C. | >600 s | >600 s | >600 s |
| 80° C. | >600 s | >600 s | 580 s |
| 90° C. | 115 s | 12 s | 5 s |
| 100° C. | 13 s | 5 s | 4 s |
| 120° C. | 9 s | 5 s | 4 s |
| 140° C. | 9 s | 4 s | 4 s |

*1 gypsum temperature is that just before dropped into water.

Since the true specific gravity of hemihydrate gypsum is about 2, gypsum particles are expected to sink in water. However, when the temperature of gypsum was about 80° C. or lower, gypsum floated on the liquid surface for 10 minutes or more without sinking. This indicates that air in the porous hemihydrate gypsum was very slowly substituted with water. In addition, this confirms that dropped gypsum granules floated on the slurry surface and that air in the gypsum granules was gradually released and formed the foam.

On the contrary, when the temperature of hemihydrate gypsum just before being dropped was 90° C. or higher, the gypsum pieces sank promptly in the water. In the experiment, when the gypsum temperature was 90° C. and water was at room temperature, nearly 2 minutes was necessary before sinking. However, in industrial processes, hemihydrate gypsum or the like are dropped into warmed gypsum slurry, for example at 60° C., and the period before sinking is shorter.

If gypsum granules release air and sink in the slurry promptly, the foam is reduced and, therefore, gypsum granules disperse promptly in the slurry without forming the aggregated particles. Then, the dihydrate gypsum particles grow sufficiently to a larger average particle size. The substantial difference in dispersion between 90° C. or higher and 80° C. or lower may be related to air in the gypsum granules being cooled and contracted by the slurry which invites water into the gypsum granules, that the surface tension between the gypsum granules and water is dependent upon the temperature, or other factors. However, the detailed causes are not clear.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of recycling dihydrate gypsum from waste gypsum boards, the method comprising:
    calcining gypsum derived from waste gypsum boards to convert the gypsum into hemihydrate and/or anhydrous type III gypsum granules;
    dropping the gypsum granules after calcination into water to mix the gypsum granules with water to prepare a gypsum slurry; and
    crystalizing dihydrate gypsum particles in the gypsum slurry; wherein
    a temperature of the gypsum granules just before being dropped into the water is 90° C. or higher.

2. The recycling method of dihydrate gypsum from waste gypsum boards according to claim 1, wherein the gypsum granules are dropped into the water without being pulverized after the step of calcining.

3. The recycling method of dihydrate gypsum from waste gypsum boards according to claim 2, wherein the temperature of the gypsum granules just before being dropped into the water is maintained at 90° C. or higher due to residual heat from the step of calcining.

* * * * *